Nov. 18, 1969     R. G. LOVE     3,478,594

VARIABLE FREQUENCY PRESSURE TRANSDUCER

Filed Aug. 2, 1967

INVENTOR

ROBERT G. LOVE

BY *Burns, Doane, Benedict, Swecker & Mathis*

ATTORNEYS

United States Patent Office 3,478,594
Patented Nov. 18, 1969

3,478,594
VARIABLE FREQUENCY PRESSURE TRANSDUCER
Robert G. Love, Duncan, Okla., assignor to Halliburton Company, Duncan, Okla., a corporation of Delaware
Filed Aug. 2, 1967, Ser. No. 657,811
Int. Cl. G01l 9/00
U.S. Cl. 73—398      10 Claims

ABSTRACT OF THE DISCLOSURE

A vibrating wire transducer is disclosed in which the effective length of the wire is changed to modify the range of frequencies at which the wire will vibrate to correspond to the range of forces to which the transducer will be required to sense. Means for adjusting the initial tension of the wire are also provided.

BACKGROUND OF THE INVENTION

Vibrating wire transducers are well known in the art. Conventionally, a wire is tensioned between a pressure diaphragm and a fixed support and an electromagnetic or mechanical force is used to vibrate the wire. Electromagnetic sensing means are provided to detect the frequency at which the wire vibrates, the frequency of vibration being dependent upon the tension in the wire as modified by the pressure applied to the diaphragm.

It is highly desirable in transducers of this type that the range of frequencies at which the wire will vibrate corresponds to the range of pressures to which the diaphragm may be subjected, for it is by this correspondence that the maximum fidelity of response of the transducer is obtained. Vibrating wire transducers have heretofore utilized a wire of a fixed length, a length calculated to be suitable for a particular range of pressures likely to be found in the specific environment anticipated for that transducer. Transducers suitable for a particular application have not proven satisfactory for other applications where the range of desired response has varied.

It is accordingly an object of the present invention to overcome this deficiency in the prior art by providing apparatus in which the effective length of the vibrating wire element can be modified.

Another object is to provide a novel apparatus in which initial adjustment of the tension in the vibrating wire can be easily and quickly made irrespective of the frequency range within which the transducer operates.

A further object is to provide apparatus whereby a single transducer may be easily adjusted so that its frequency response range corresponds to the particular range of pressures anticipated in a particular application.

A still further object is to provide a method and apparatus whereby the effective span of the wire in a vibrating wire transducer may be adjusted after installation without effecting the tension in the wire.

These and other objects and advantages of the present invention will become more fully apparent from the claims and from the description when read in conjunction with the appended drawings.

THE DRAWINGS

Figure 1:
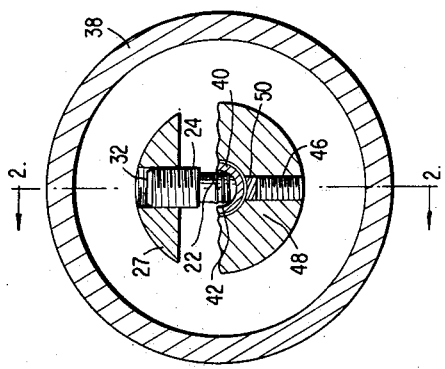
Figure 2:
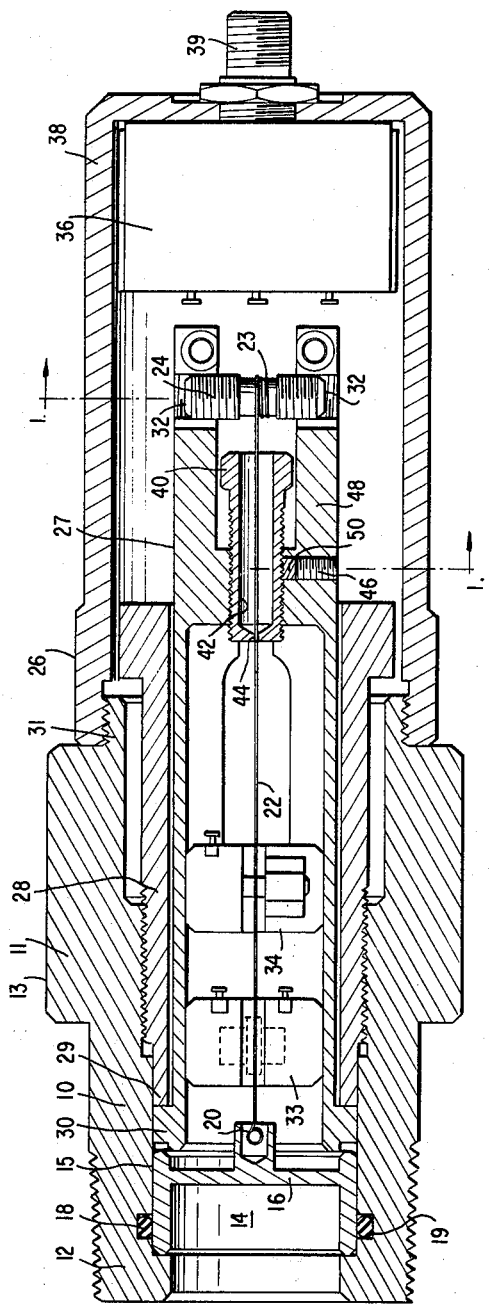

FIGURE 1 is a section taken through lines 1—1 of FIGURE 2 of the pressure transducer of the subject invention; and FIGURE 2 is a section taken through lines 2—2 of FIGURE 1.

THE PREFERRED EMBODIMENT

Referring now to the drawings, the pressure transducer comprises a generally cylindrical housing 10 including an outer body 11 externally threaded at one end 12 whereby the housing may be removably threaded into an aperture (not shown) placing thereby its central pressure cavity 14 in fluid communication with the source of pressure to be measured. Outer body 11 may be externally adapted with planar surfaces 13 so as to facilitate the gripping thereof by a suitable tool to facilitate rotation.

Cavity 14 is defined by internal walls 15 of end 12 of the outer body 11 of housing 10 and a pressure responsive diaphragm 16. Diaphragm 16 is sealed to housing 10 by means of annular seal 18 contained in annular groove 19 in walls 15. Attached to the side of pressure responsive diaphragm 16 opposite to that of pressure chamber 14 is one end 20 of a metallic wire 22. The other end 23 of wire 22 is coiled about and attached to a threaded bolt 24 supported internally of housing cap 26 by frame 27 normal to the axis thereof at a fixed distance from diaphragm 16. An annular sleeve 28 is threaded into outer body 11 securing frame 27 thereto by the abutment of the ends 29 thereof against a flange 30 on the end of frame 27.

A novel feature of the present transducer is the means by which the tension in vibrating wire 22 may be adjusted for purposes of calibration. Since wire 22 is coiled about bolt 24, rotation thereof coils or uncoils wire 22 and thus modifies the tension in the wire. Cylindrical cap 26 is removably threaded onto the other end 31 of the outer body 11 of housing 10 to provide ready access to bolt 24. Removal of cap 26 exposes the ends 32 of bolt 24 which may be slotted or otherwise adapted to receive a suitable tool for imparting rotation to bolt 24 thereby accomplishing the calibration or zero adjustment of the frequency response.

Mounted within frame 27 and surrounding wire 22 intermediate the ends 20 and 23 thereof is a coil 33, which may be used in a conventional manner to impart an initial or continuous vibration to the wire. Sensing coil 34 may be similarly mounted within frame 27 near the midpoint or area of maximum deflection of vibrating wire 22 to facilitate detection of the frequency of vibration.

Coil 34 is electrically connected to amplifier driver assembly 36 mounted within the extreme end 38 of cap 26. A suitable threaded or quick release electrical connector 39 may be incorporated into end 38 of cap 26 to provide for remote attachment to a suitable indicator device (not shown). Suitable amplifiers, connectors and indicator devices are well known in the art and the specific construction thereof is not crical to the present invention.

Another novel feature of the present invention is the means for adjusting the range of frequency response. A bolt 40 having a hollow interior bore 42 is threadably mounted within frame 27 of the housing 10. Wire 22 extends along the axis of bore 42 which has a constriction at one end 44 so as to tightly conform to the diameter of wire 22 thereby restricting transversely the movement of wire 22 but allowing movement of bolt 40 along the wire. The effective length of vibrating wire 22 is thus determined by the position of bolt 40 with respect to frame 27, i.e. the effective length of wire 22 is the distance between diaphragm 16 and end 44 of bolt 40 which transversely confines wire 22.

To effect correspondence between the range of pressures which the transducer is expected to detect and the frequency range of the vibrating wire, it is only necessary to adjust the position of bolt 40 with respect to frame 27 thereby modifying the effective vibrating length of wire 22. To prevent unwanted and possibly undetected shifting of bolt 40 and the accompanying change in the range of frequency response, a set screw 46 may be provided in the walls 48 of frame 27. Clockwise rotation of set screw 46 drives a plug 50 into contact with the threads of bolt 40. Plug 50 may comprise any material of sufficient ductility to prevent damage to the threads of bolt 40 by contact therewith such as polytetrafluoroethylene or the like. Thus, the tension of the wire may be initially adjusted and thereafter the length of the vibrating portion of the wire varied as may be desired without affecting the tension of the wire.

Numerous changes and modifications may be made in the embodiment of the invention described without departing from the spirit or essential characteristics thereof.

What is claimed and desired to be secured by Letters Patent is:

1. A vibrating wire transducer comprising:
an elongated housing having a wire support means,
a member subjected to a variable force to be measured mounted in one end of the housing,
a wire attached at one end to said member and attached at the other end to said support means,
means for vibrating said wire,
means for detecting the frequency at which said wire vibrates, and
means for changing the range of the frequency response of said wire by changing the effective length of said wire a predetermined amount.

2. The transducer of claim 1 wherein said means for changing the effective vibrating length of said wire comprises an element having an axial bore through which said wire passes, said bore having a restricted portion for transversely restraining said wire against vibration, said element being positionable along the length of said wire whereby the length of wire between said member and the point at which said wire is transversely restrained against vibration may be varied.

3. The transducer of claim 2 including means for locking said element at predetermined positions along said wire.

4. The transducer of claim 2 wherein said means for vibrating said wire and said means for detecting the frequency at which said wire vibrates are mounted internally of said housing intermediate said member and the restricted portion of said element.

5. The transducer of claim 4 further having means for adjusting the tension in said wire.

6. The transducer of claim 1 including means for adjusting the tension in said wire.

7. The transducer of claim 6 wherein said tension adjusting means comprises a shaft mounted for rotation within said housing, the axis of said shaft being normal to the axis of said housing, said wire being wound about said shaft whereby rotation of said shaft adjusts the tension in said wire.

8. A vibrating wire transducer comprising:
an elongated housing having a wire support means,
said housing including an outer body, a cap removably secured to said outer body, a frame insertable into said housing, said frame supporting said other end of said wire and supporting said vibrating and detecting means intermediate said member and the restricted portion of said element, and means for securing said frame within said outer body,
a member subjected to a variable force to be measured mounted in one end of the housing,
a wire attached at one end to said member and attached at the other end to said support means,
means for vibrating said wire,
means for detecting the frequency at which said wire vibrates, and
means for changing the effective length of said wire including an element having an axial bore through which said wire passes, said bore having a restricted portion for transversely restraining said wire against vibration, said element being positionable along the length of said wire whereby the length of wire between said member and the point at which said wire is transversely restrained against vibration may be varied.

9. A vibrating wire transducer comprising:
an elongated housing having a wire support means, said housing including an outer body, a cap removably secured to said outer body, a frame insertable into said housing, said frame supporting said other end of said wire and supporting said vibrating and detecting means intermediate said member and the restricted portion of said element, and means for securing said frame within said outer body,
a member subjected to a variable force to be measured mounted in one end of the housing,
a wire attached at one end to said member and attached at the other end to said support means,
means for vibrating said wire,
means for detecting the frequency at which said wire vibrates,
means for changing the effective length of said wire including an element having an axial bore through which said wire passes, said bore having a restricted portion for transversely restraining said wire against vibration, said element being positionable along the length of said wire whereby the length of wire between said member and the point at which said wire is transversely restrained against vibration may be varied,
said means for vibrating said wire and said means for detecting the frequency at which said wire vibrates being mounted internally of said housing intermediate said member and restricted portion of said element, and
means for adjusting the tension in said wire including a shaft mounted for rotation within said housing, the axis of said shaft being normal to the axis of said housing, said wire being wound about said shaft whereby rotation of said shaft adjusts the tension in said wire.

10. A vibrating wire transducer comprising:
an elongated housing having a wire support means,
a condition responsive member subjected to a variable force to be measured mounted in one end of the housing,
a wire attached at one end to said condition responsive member and attached to the other end to said support means,
means for vibrating said wire,
means for detecting the frequency at which said wire vibrates, said wire vibrating at a frequency dependent upon the force to which the condition responsive member is subjected, and
means for changing the range of the frequency response of said wire to forces on said condition responsive member, said means including adjustable means for changing the effective length of said wire.

References Cited

UNITED STATES PATENTS

| | | |
|---|---|---|
| 2,970,479 | 2/1961 | Wikstrom. |
| 2,972,923 | 2/1961 | Fender _____ 84—307 XR |
| 3,005,135 | 10/1961 | Palmer et al. |
| 3,230,816 | 1/1966 | Jira _____ 84—315 |

DONALD O. WOODIEL, Primary Examiner